(12) United States Patent
Weeks et al.

(10) Patent No.: US 11,264,767 B2
(45) Date of Patent: Mar. 1, 2022

(54) ELECTRICALLY INTERLOCKED RECEPTACLES IN POWER PEDESTALS

(71) Applicant: Eaton Intelligent Power Limited, Dublin (IE)

(72) Inventors: Cory Robert Weeks, Hampton, VA (US); Jason D. Easton, Williamsburg, VA (US); Jeffery Scott Kuykendall, Greenwood, SC (US); Michel Rivas, Miami Beach, FL (US); Paul D. Seff, Williamsburg, VA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 336 days.

(21) Appl. No.: 16/578,920

(22) Filed: Sep. 23, 2019

(65) Prior Publication Data
US 2021/0091515 A1    Mar. 25, 2021

(51) Int. Cl.
*H01R 13/713*  (2006.01)
*H02H 7/22*    (2006.01)
*H01R 27/02*   (2006.01)

(52) U.S. Cl.
CPC ....... *H01R 13/713* (2013.01); *H01R 13/7135* (2013.01); *H01R 27/02* (2013.01); *H02H 7/22* (2013.01)

(58) Field of Classification Search
CPC .. H01R 13/713; H01R 27/02; H01R 13/7135; H02H 7/22; B60L 53/30; B60L 53/31; H02B 1/50; H02G 3/0493
USPC .......................................................... 361/78
See application file for complete search history.

(56) References Cited

U.S. PATENT DOCUMENTS

2010/0296230 A1    11/2010  Storck et al.
2011/0127852 A1*    6/2011  Papallo, Jr ............. H02H 7/261
                                                    307/115

* cited by examiner

*Primary Examiner* — Dharti H Patel
(74) *Attorney, Agent, or Firm* — Myers Bigel, P.A.

(57) ABSTRACT

A power pedestal is described. The power pedestal includes a plurality of receptacles that are configured to connect to external devices. The plurality of receptacles includes a first receptacle and a second receptacle of the plurality of receptacles. The first receptacle and the second receptacle are electrically interlocked with one another. The power pedestal includes a first circuit breaker connected to the first receptacle and a second circuit breaker connected to the second receptacle, and a shunt trip circuit that is configured to trip the first circuit breaker to disable power to the first receptacle of the power pedestal, responsive to the second circuit breaker associated with the second receptacle of the power pedestal being in an active state. Related devices and methods are also described.

20 Claims, 9 Drawing Sheets

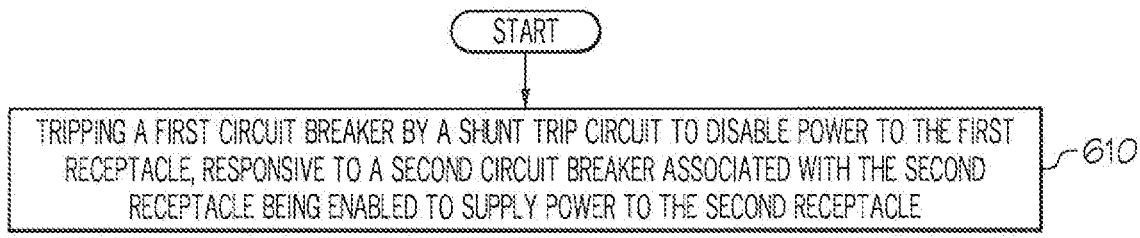
FIG. 6
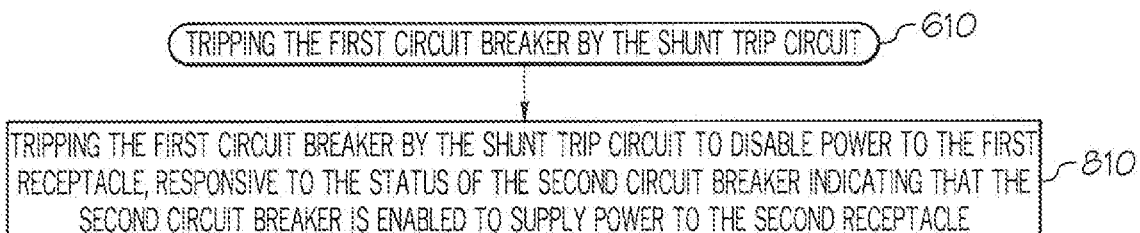
FIG. 7
FIG. 8

US 11,264,767 B2

ELECTRICALLY INTERLOCKED RECEPTACLES IN POWER PEDESTALS

FIELD

The present invention relates to power pedestals and may be particularly suitable for marine or recreational vehicle power pedestals.

BACKGROUND

Power pedestals are typically free-standing outdoor electrical units. Power pedestals can provide utility power distribution for target devices such as marine or recreational vehicles. Power pedestals may include one or more circuit breakers and power receptacles that can be used to provide power to the target devices. The power pedestals include one or more circuit breakers that provide fault protection for the power receptacles.

SUMMARY

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

The accompanying drawings, which are included to provide a further understanding of the present disclosure and are incorporated in and constitute a part of this application, illustrate certain embodiment(s). In the drawings:

FIGS. 6 to 12 are flowcharts of operations of a power pedestal that includes electrically interlocked receptacles, according to various embodiments described herein.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

For marina or RV park construction projects, costs related to electrical wiring may be significant. Wiring costs may be reduced by using smaller gauge wires that are less expensive. Embodiments of the present inventive concepts arise from a recognition that when using smaller gauge wires to connect to a power pedestal, the maximum current draw of the power pedestal, and thus, the power and/or operating wattage, needs to be reduced. As described herein, the smaller wire gauges may be used to route power to the power pedestal using an interlocking mechanism that de-energizes unused sections of the pedestal. By de-energizing unused sections, such as by deactivating power receptacles, small gauge wires may be used to supply power to the power pedestal without exceeding the maximum load rating of the power pedestal.

As used herein, the term "vehicle" shall expressly include, but not be limited by, a land vehicle, a marine vehicle, an air vehicle or another motor vehicle.

As used herein, the term "land vehicle" shall expressly include, but not be limited by, any land-based vehicles having pneumatic tires, any rail-based vehicles, any maglev vehicles, automobiles, cars, trucks, station wagons, sport-utility vehicles (SUVs), recreational vehicles, construction vehicles, off road vehicles, all-terrain vehicles, farm vehicles, fleet vehicles, motor homes, vans, buses, motorcycles, mopeds, campers and trailers.

As used herein, the term "marine vehicle" shall expressly include, but not be limited by, any water-based vehicles, ships, boats, personal water craft or other vessels for travel on water, submarines, or other vessels for travel under water.

As used herein, the term "air vehicle" shall expressly include, but not be limited by, any air-based vehicles, airplanes, jets, aircraft, airships, drones, balloons, blimps, or dirigibles.

As used herein, the term "power pedestal" shall mean a pedestal structured to receive input power from input power terminals (e.g., utility power terminals) and output power to a number of output power receptacles held by the power pedestal.

Figure 1:
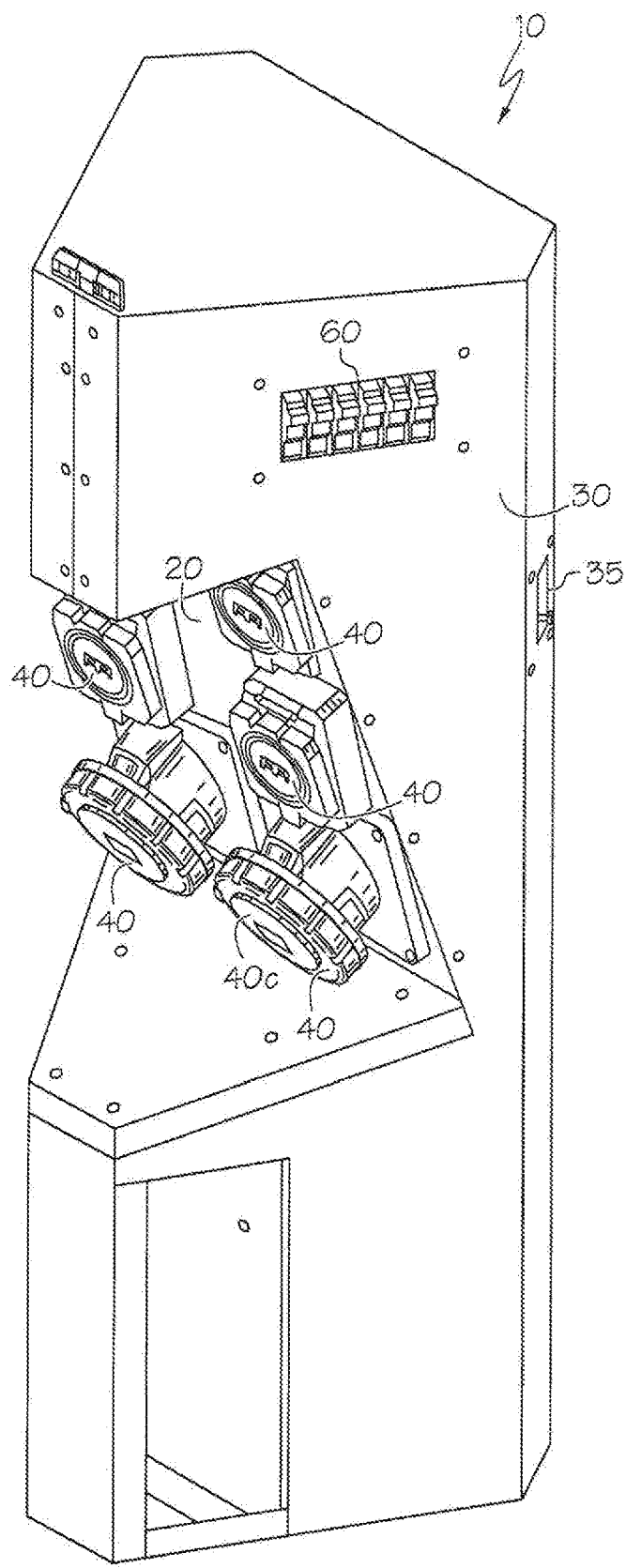
FIG. 1 is an example power pedestal, according to various embodiments described herein.

Referring to FIG. 1, a power pedestal 10 such as, for example and without limitation, a marine and/or vehicle power pedestal, includes a tower 30 that houses a skeleton tower assembly 20 with various output power receptacles 40, also referred to as "receptacles", that are externally accessible. The power pedestal 10 may be configured with individual covers 40c for each receptacle 40. The receptacles 40 may receive a plug or other connection to a vehicle, or any other power-driven device. The power pedestal 10 may include one or more circuit breakers 35 that are associated with the receptacles 40. The power pedestal 10 may include a load center 60 for monitoring parameters such as current, power, etc. of the power pedestal 10.

Figure 2:
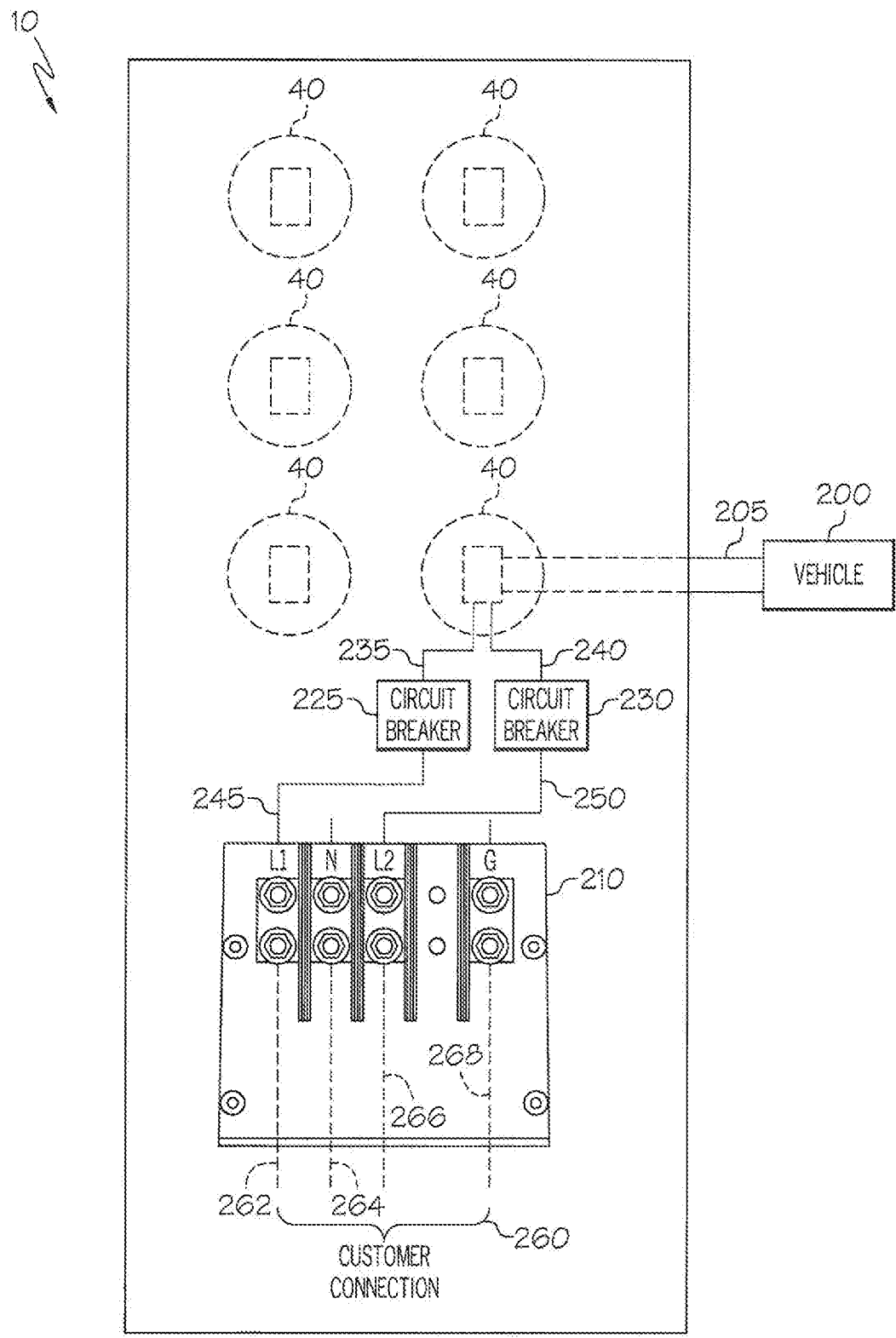
FIG. 2 illustrates the bus bar connections and circuit breakers of the power pedestal of FIG. 1, according to various embodiments described herein.

FIG. 2 illustrates another view of the power pedestal 10 of FIG. 1. Referring to FIG. 2, a bus bar 210 may receive a power connection 260 from utility power terminals. The power connection 260 may include wires 262, 264, 266, and 268 that are respectively connected to line terminal L1, neutral terminal N, line terminal L2, and ground terminal G of the bus bar 210. Line terminals L1 and L2 may be connected to circuit breakers 225 and 230 by wires 245 and 250. The circuit breakers 225 and 230 from line terminals L1 and L2 are connected to receptacle 40. A device such as vehicle 200 may be connected by a cable 205 to plug into receptacle 40.

Figure 3:
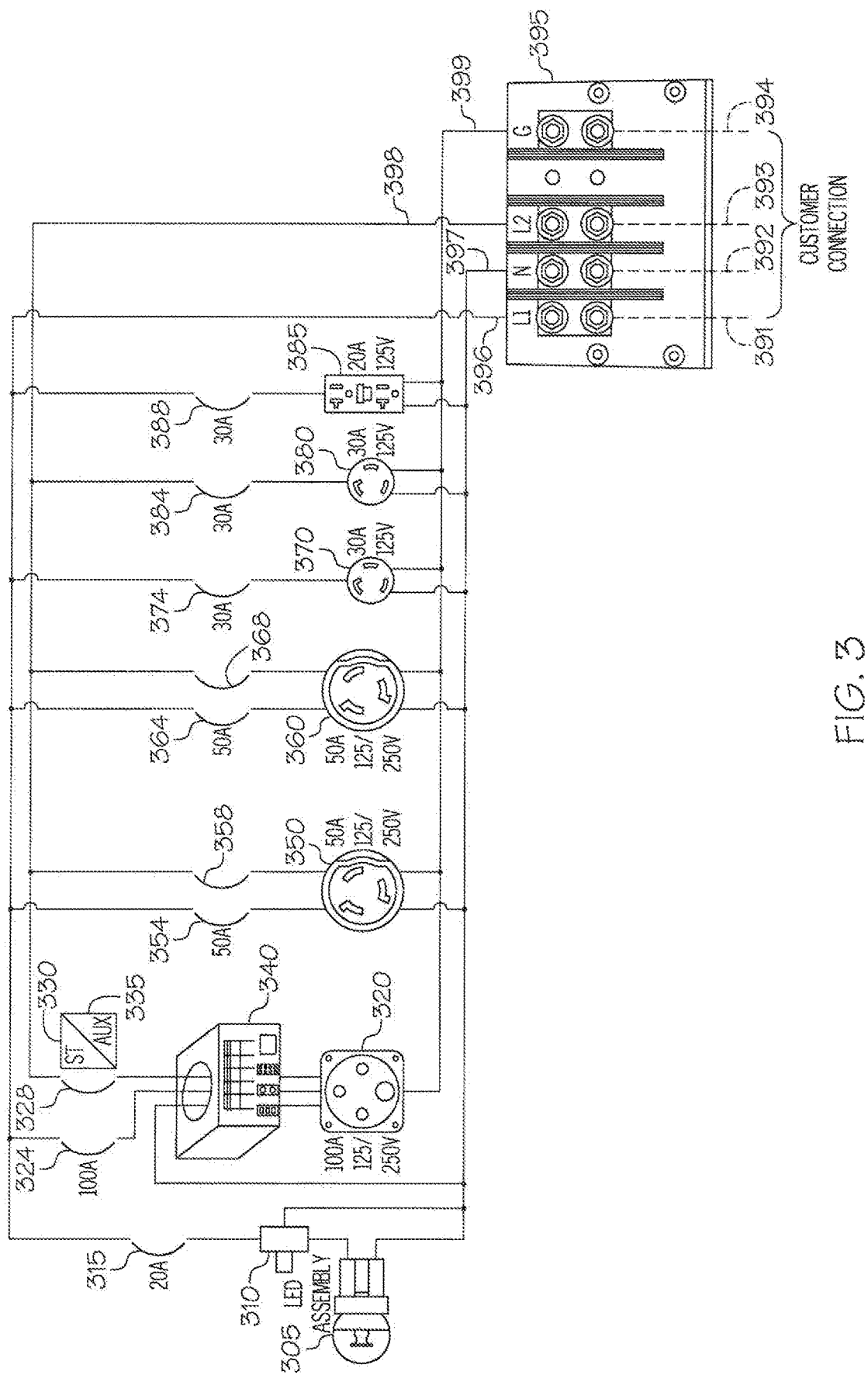
FIG. 3 is a circuit diagram of electrically interlocked receptacles in a power pedestal including a shunt trip circuit and an auxiliary switch, according to various embodiments described herein.

FIG. 3 is a circuit diagram of electrically interlocked receptacles in a power pedestal that includes a shunt trip circuit and an auxiliary switch. Referring to FIG. 3, bus bar 395 may be similar to the bus bar 210 of FIG. 2. Bus bar 395 may receive power connections through wires 391, 392, 393, and 394 that are respectively connected to line terminal L1, neutral terminal N, line terminal L2, and ground terminal G of the bus bar 395. Neutral terminal N and ground terminal G may be connected by wires 397 and 399 to various receptacles 320, 350, 360, 370, 380, and/or 385 as well as to ground fault relay 340, and/or LEDs 305, 310. Line terminal L1 and/or line terminal L2 may be connected through circuit breakers 354/358 to receptacle 350, through circuit breakers 364/368 to receptacle 360, through circuit breaker 374 to receptacle 370, through circuit breaker 384 to receptacle 380, and/or through circuit breaker 388 to receptacle 385. Although receptacles 350 and 360 are shown as each having two breakers on line terminals L1 and L2, for ease of non-limiting discussion, a single circuit breaker may be discussed for each receptacle. However, various embodiments described herein may be applied to a single circuit breaker or multiple circuit breakers associated with each receptacle.

Still referring to FIG. 3, receptacle 320 may be electrically interlocked to receptacle 350 such that the overall power collectively drawn by these receptacles does not exceed a rated power of the power pedestal. A shunt trip circuit 330 and/or an auxiliary switch 335 may be associated with circuit breaker 328 and/or receptacle 320. The shunt trip circuit 330 may trip circuit breaker 328 to disable power to the receptacle 320 of the power pedestal when circuit breaker 354 associated with the receptacle 350 of the power pedestal is in an active state. Auxiliary switch 335 is associated with circuit breaker 328 that corresponds to receptacle 320. Although an auxiliary switch 335 and shunt trip circuit 330 are shown as corresponding to circuit breaker 328 and/or receptacle 320, any of the receptacles and corresponding circuit breakers may have an associated shunt trip circuit and/or associated auxiliary switch. The auxiliary switch 335 may receive the status of the circuit breaker 354 corresponding to the receptacle 350. The status of the circuit breaker 354 may be active or tripped to disable current flow through the circuit breaker, or may be inactive or conducting to allow current flow through the circuit breaker. Based on the switching state of auxiliary switch 335, the shunt trip circuit 330 may trip circuit breaker 328 to disable power to receptacle 320 when the status of circuit breaker 354 indicates that the circuit breaker 354 is enabled to supply power to receptacle 350. In other words, the operational section of the power pedestal that includes receptacle 320 is disabled when receptacle 350 has a device plugged in and is drawing power, to prevent the total power drawn by receptacle 320 and receptacle 350 from exceeding specified maximum power for the power pedestal, as supported by the gauges of wires 391, 392, 393, and 394 that are supplying utility power to the power pedestal. An operation section of the power pedestal may include a receptacle and corresponding circuit breakers, shunt trip circuits, and/or auxiliary switches. The shunt trip circuit 330 may be powered by conductors attached to the circuit breaker 328.

Still referring to FIG. 3, in some embodiments, multiple receptacles, such as, for example, receptacle 350 and receptacle 360 may be part of the same operational section of the power pedestal and may both have devices plugged in without exceeding the power rating of the power pedestal. For example, receptacle 350 and receptacle 360 may each be rated to supply 50 A at 250 V and receptacle 320 may be rated to supply 100 A at 250 V. The power pedestal may have a power rating corresponding to a maximum current of 125 A at 250 V. Both receptacles 350 and 360 may be operational at the same time without exceeding the power rating of the power pedestal. However, when either of receptacles 350 and 360 has a device plugged in, receptacle 320 may be disabled since operation of one of the receptacles 350 and 360 along with receptacle 320 may exceed the power rating of the power pedestal. Similarly, in some embodiments, receptacles 370, 380, and 385 may be grouped together into the same operational section of the power pedestal and have devices plugged into each of the receptacles 370, 380, and 385 without exceeding the power rating of the power pedestal.

Figure 4:
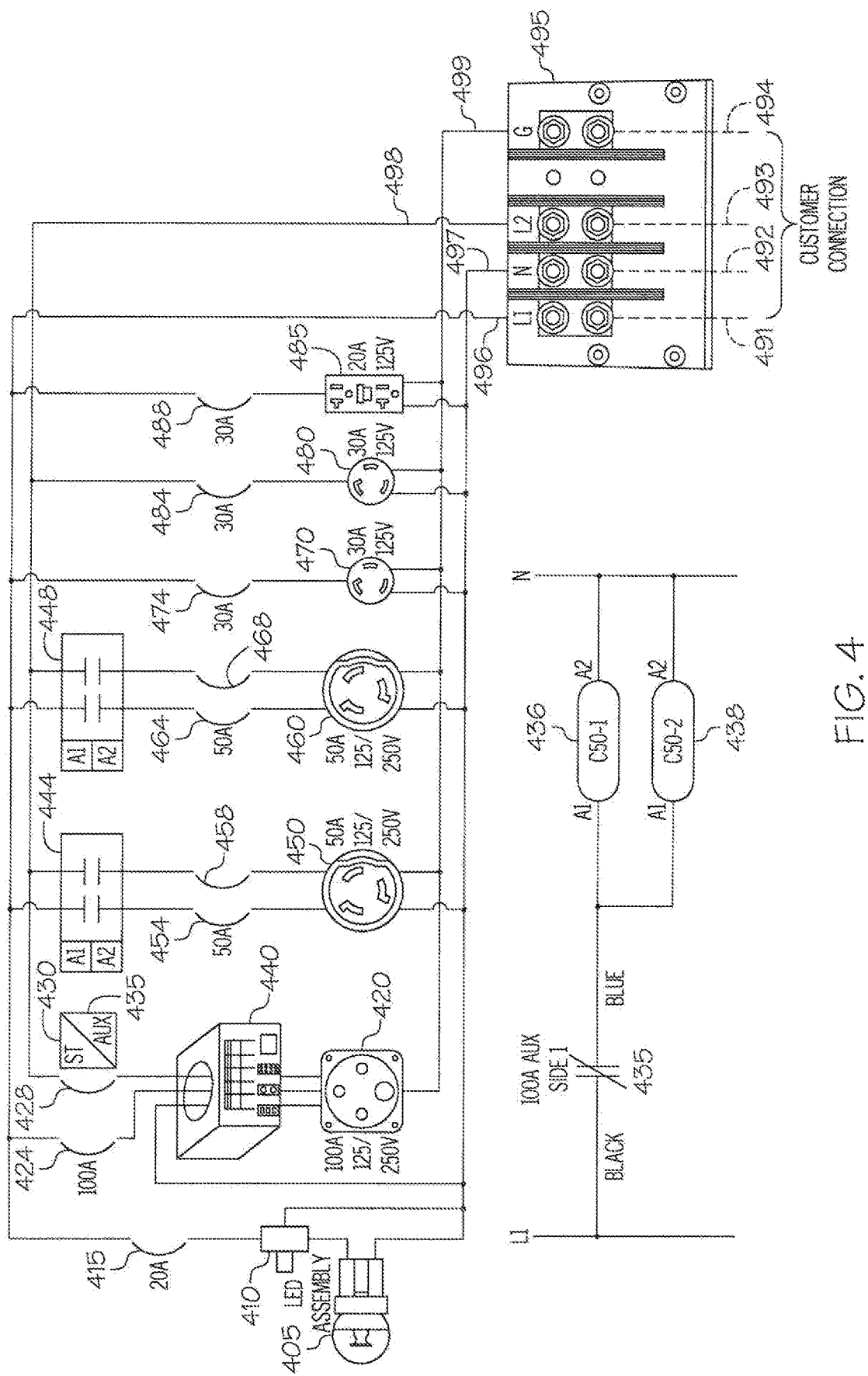
FIG. 4 is a circuit diagram of electrically interlocked receptacles in a power pedestal including contactors, according to various embodiments described herein.

FIG. 4 is a circuit diagram of electrically interlocked receptacles in a power pedestal including contactors. Referring to FIG. 4, bus bar 495 may be similar to the bus bar 210 of FIG. 2 and/or bus bar 395 of FIG. 3. Bus bar 495 may receive power connections through wires 491, 492, 493, and 494 that are respectively connected to line terminal L1, neutral terminal N, line terminal L2, and ground terminal G of the bus bar 495. Neutral terminal N and ground terminal G may be connected by wires 497 and 499 to various receptacles 420, 450, 460, 470, 480, and/or 485 as well as to ground fault relay 440, and/or LEDs 405, 410. Line terminal L1 and/or line terminal L2 may be connected through circuit breakers 454/458 to receptacle 450, through circuit breakers 464/468 to receptacle 460, through circuit breaker 474 to receptacle 470, through circuit breaker 484 to receptacle 480, and/or through circuit breaker 488 to receptacle 485.

Still referring to FIG. 4, receptacle 420 may be electrically interlocked to receptacle 450. A shunt trip circuit 430 and/or an auxiliary switch 435 may be associated with circuit breaker 428 and/or receptacle 420. The shunt trip circuit 430 may trip circuit breaker 428 to disable power to the receptacle 420 of the power pedestal when circuit breaker 454 associated with the receptacle 450 of the power pedestal is in an active state. Specifically, upon a ground fault, circuit breaker 454 may trip via the inputs of the shunt trip circuit 430 to the circuit breaker 454. Auxiliary switch 435 is associated with circuit breaker 428 that corresponds to receptacle 420. The auxiliary switch 435 may receive the status of the circuit breaker 454 corresponding to the receptacle 450. For example, auxiliary switch 435 may be connected to a contactor circuit 444 associated with receptacle 450. Contactor 436, connected to circuit breaker 454, may include a coil that is charged when receptacle 450 is drawing power to a device. Similarly, contactor 438, connected to circuit breaker 458, may include a coil that is charged when receptacle 450 is drawing power to a device. Contactors 436 and 438 may be connected to the neutral terminal N of bus bar 495. When the coil of contactor 436 is charged, the auxiliary switch 435 may be configured to disable power to receptacle 420. In some embodiments, a shunt trip circuit 430 may trip circuit breaker 428 to disable power to receptacle 420 when the status of circuit breaker 454 indicates that the circuit breaker 454 is enabled to supply power to receptacle 450. The operational section of the power pedestal that includes receptacle 420 is disabled when receptacle 450 has a device plugged in that is drawing power, to prevent the total power drawn by receptacle 420 and receptacle 450 from exceeding specified maximum power for the power pedestal, as supported by the gauges of wires 491, 492, 493, and 494 that are supplying power to the power pedestal. Since the contactors 436 and 438 include coils, there may be a delay in the switching by the auxiliary switch 435 when using contactors 436 and/or 438. Using the shunt trip circuit 430 with the auxiliary switch 435 may be advantageous when compared to using contactors 436 and/or 438, since when the auxiliary switch 435 is activated by the shunt rip circuit 430, there is little or reduced delay in response time.

Figure 5:
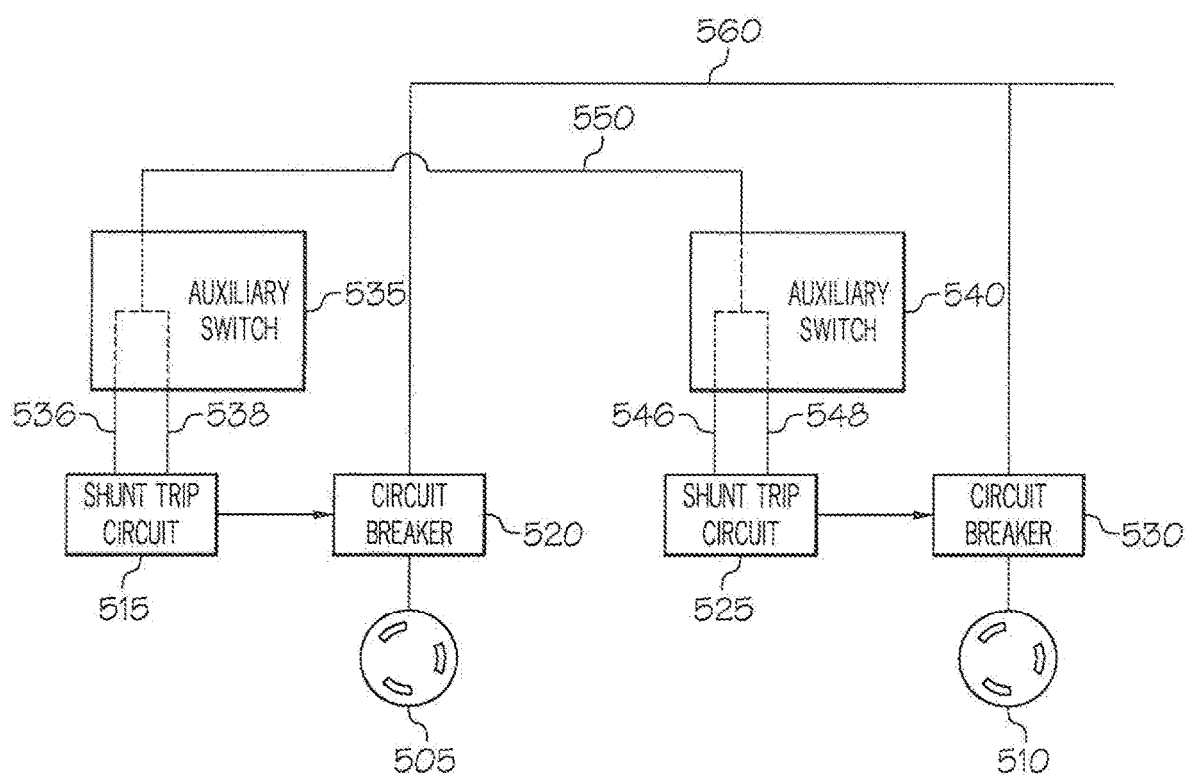
FIG. 5 is a block diagram of electrically interlocked receptacles in a power pedestal including a shunt trip circuit and an auxiliary switch, according to various embodiments described herein.

FIG. 5 is a block diagram of electrically interlocked receptacles in a power pedestal including a shunt trip circuit and an auxiliary switch, such as illustrated in FIG. 3. Referring to FIG. 5, receptacle 505 is connected to circuit breaker 520, which is controlled by auxiliary switch 535 and shunt trip circuit 515. Receptacle 510 is connected to circuit breaker 530, which is controlled by auxiliary switch 540 and shunt trip circuit 525. Auxiliary switch 535 associated with receptacle 505 is connected to and shares status information with auxiliary switch 540, which is associated with receptacle 510. In some embodiments, auxiliary switches 535 and 540 may be integrated with respective circuit breakers 520 and 530. Auxiliary switch 535 may receive the status of the circuit breaker 530 corresponding to the receptacle 510. Auxiliary switch 535 may selectively use switching paths 536 and 538 to indicate to shunt trip circuit 515 whether circuit breaker 520 should be active to allow power to receptacle 505. The shunt trip circuit 515 may trip circuit breaker 520 to disable power to receptacle 505 when the status of circuit breaker 530 indicates that the circuit breaker 530 is enabled to supply power to receptacle 510. In other words, the operational section of the power pedestal that includes receptacle 505 may be disabled when receptacle 510 has a device plugged in, to prevent the total power drawn by receptacle 505 and receptacle 510 from collectively exceeding specified maximum power for the power pedestal.

Still referring to FIG. 5, auxiliary switch 540 may receive the status of the circuit breaker 520 corresponding to the receptacle 505. Auxiliary switch 540 may selectively use switching paths 546 and 548 to indicate to shunt trip circuit 525 whether circuit breaker 530 should be active to allow power to receptacle 510. The shunt trip circuit 525 trips circuit breaker 530 to disable power to receptacle 510, when the status of circuit breaker 520 indicates that the circuit breaker 520 is enabled to supply power to receptacle 505. The operational section of the power pedestal that includes receptacle 510 is disabled when receptacle 505 has a device plugged in, to prevent the total power drawn by receptacle 505 and receptacle 510 from collectively exceeding specified maximum power for the power pedestal.

FIGS. 6 to 12 are flowcharts of operations of the power pedestal 10 of FIGS. 1 and 2 and/or the circuits of FIGS. 3 to 5. The power pedestal may include a first receptacle and a second receptacle that are configured to supply power to external devices. Referring to FIG. 6, a first circuit breaker may be tripped by a shunt trip circuit to disable power to the first receptacle of the power pedestal when a second circuit breaker associated with the second receptacle of the power pedestal is enabled to supply power to the second receptacle, at block 610. In other words, to prevent the power load for the power pedestal from exceeding a specified value, if a device is plugged into a second receptacle associated with the second circuit breaker, the first receptacle by disabled from supplying power to another device by the shunt trip circuit tripping the first circuit breaker that is associated with the first receptacle.

Referring to FIG. 7, an auxiliary switch associated with the shunt trip circuit and the first circuit breaker may receive the status of the second circuit breaker associated with the second receptacle, at block 710. The status of the second circuit breaker indicates when the second circuit breaker is enabled to supply power to the second receptacle. The auxiliary switch associated with the second circuit breaker may be in communication with the auxiliary switch associated with the first circuit breaker in order to facilitate coordination to prevent surpassing the certified or rated power load of the power pedestal by supplying power to multiple devices that are plugged in.

Referring to FIG. 8, tripping the first circuit breaker by the shunt trip circuit may include tripping the first circuit breaker by the shunt trip circuit to disable power to the first receptacle, at block 810. Tripping the first circuit breaker may occur responsive to the status of the second circuit breaker indicating that the second circuit breaker is enabled to supply power to the second receptacle. In other words, both circuit breakers will not be enabled to supply power at the same time, to avoid surpassing the certified power load of the power pedestal.

Figure 9:
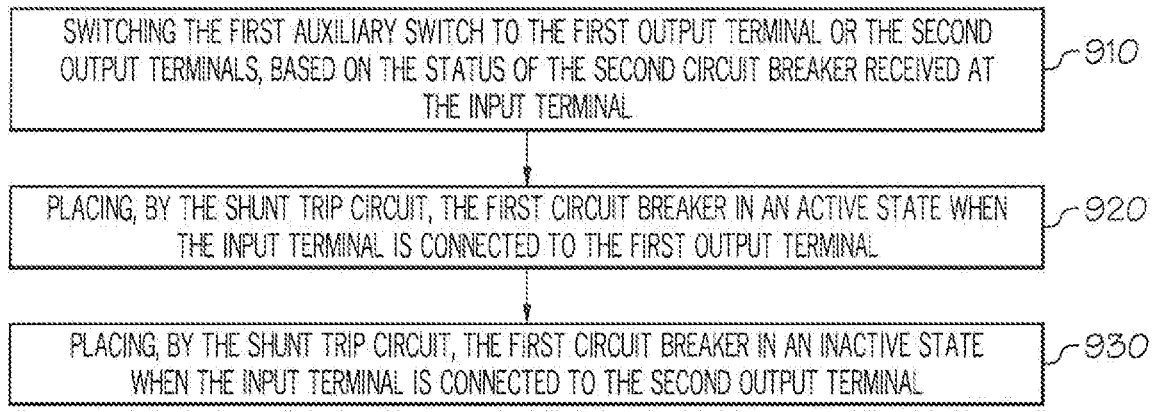

Referring to FIG. 9, a first auxiliary switch may include an input terminal and first and second output terminals. The input terminal of the first auxiliary switch may be connected to a second auxiliary switch corresponding to the second receptacle to receive the status of the second circuit breaker. The power pedestal may be configured to perform switching of the first auxiliary switch to the first output terminal or the second output terminal, based on the status of the second circuit breaker received at the input terminal, at block 910. The shunt trip circuit may place the first circuit breaker in an active state when the input terminal is connected to the first output terminal, at block 920. The shunt trip circuit may place the first circuit breaker in an inactive state when the input terminal is connected to the second output terminal, at block 930.

Figure 10:
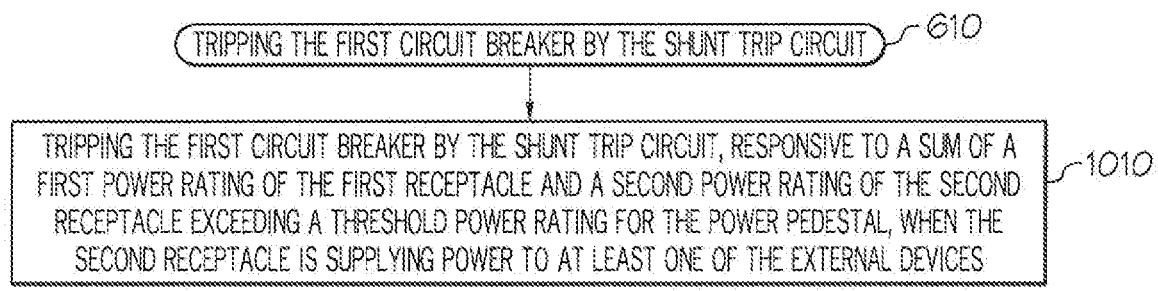

Referring to FIG. 10, tripping the first circuit breaker by the shunt trip circuit may include tripping the first circuit breaker by the shunt trip circuit, responsive to a sum of a first power rating of the first receptacle and a second power rating of the second receptacle exceeding a threshold power rating for the power pedestal, when the second receptacle is supplying power to at least one of the external devices, at block 1010. In other words, the collective power ratings of the receptacles in the power pedestal are monitored when devices are plugged in to prevent exceeding an overall power rating of the power pedestal.

Figure 11:
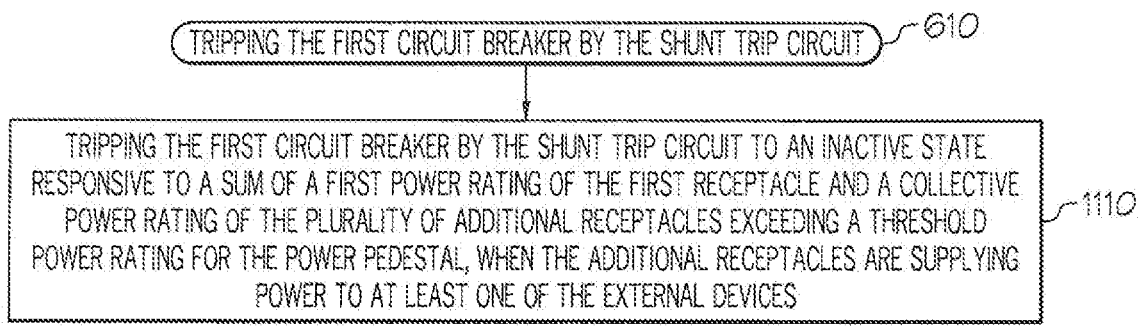

Referring to FIG. 11, the second receptacle may include a two or more additional receptacles that correspond to two or more respective circuit breakers. The first circuit breaker may be tripped by the shunt trip circuit to an inactive state responsive to a sum of a first power rating of the first receptacle and a collective power rating of the two or more of additional receptacles exceeding a threshold power rating for the power pedestal, when the additional receptacles are supplying power to at least one of the external devices, at block 1110. In this case, the two or more additional receptacles may be active at a same time, responsive to the collective power rating of the additional receptacles being below the threshold power rating for the power pedestal. An overall power rating of the power pedestal may be the greater of the first power rating of the first receptacle and the collective power rating of the two or more of additional receptacles.

Figure 12:

Referring to FIG. 12, power at the first receptacle and the second receptacle may be received from a bus bar, at block 1210. The bus bar may correspond to bus bar 210 of FIG. 2, bus bar 395 of FIG. 3, and/or bus bar 495 of FIG. 4. The bus bar may include one or more power lines electrically connected to the circuit breakers associated with the receptacles. The bus bar may be coupled to an external power source by one or more wires having respective wire gauges that are insufficient for carrying a load of the sum of the power ratings of the available receptacles. The smaller gauge wires routed to a power pedestal reduces the maximum current draw of the power pedestal, thereby limiting power and/or operating wattage. Various embodiments described herein allow the smaller wire gauges to be used to route power to the power pedestal by using an interlocking mechanism that de-energizes unused operational sections of the pedestal.

Figure 13:
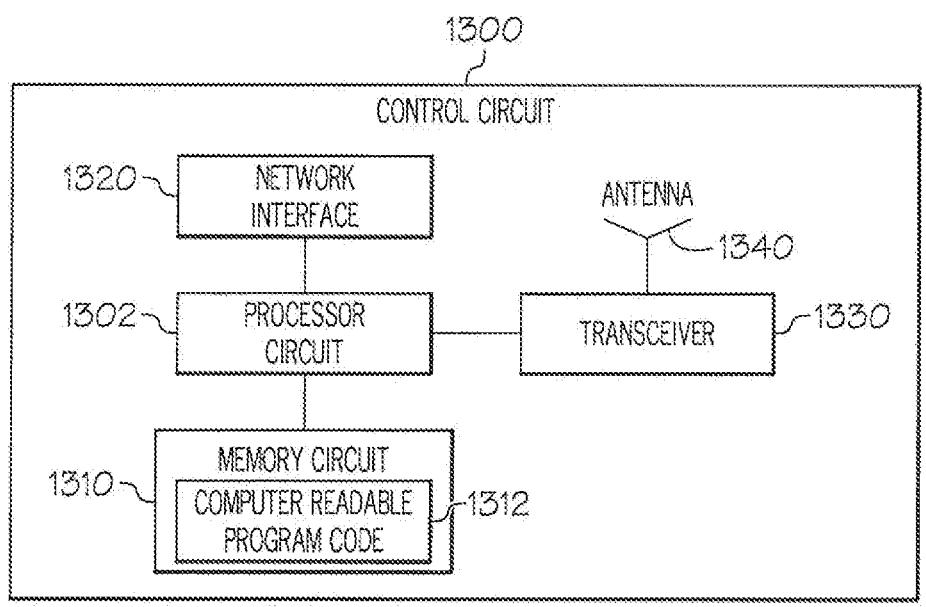
FIG. 13 is a block diagram of a control circuit for a power pedestal, according to various embodiments described herein.

FIG. 13 is a block diagram of a control circuit for a power pedestal. The control circuit for the power pedestal may be integrated with various components of the power pedestal or be located external to the power pedestal. Referring to FIG. 13, control circuit 1300 may include a network interface 1320 for communicating with the circuit breakers, shunt trip circuits, auxiliary switches and/or other components, according to various embodiments described herein. A processor circuit 1302 may perform various operations described herein. The processor circuit is connected to a memory circuit 1310 that includes computer readable program code 1312 that implements various operations described herein. Processor circuit 1302 is connected to a transceiver 1330 that communicates with circuit breakers, shunt trip circuits, auxiliary switches and/or other components, according to various embodiments described herein. Transceiver 1330 may communicate with various components through a wired connection or through a wireless connection using antenna 1340.

Further Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements, and elements should not be limited by these terms; rather, these terms are only used to distinguish one element from another element. Thus, a first element discussed could be termed a second element without departing from the scope of the present inventive concepts.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams, circuits, and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

The flowcharts and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

The invention claimed is:

1. A power pedestal comprising:
a plurality of receptacles that are configured to connect to external devices, the plurality of receptacles comprising a first receptacle and a second receptacle, wherein the first receptacle and the second receptacle are electrically interlocked with one another;
a first circuit breaker connected to the first receptacle and a second circuit breaker connected to the second receptacle; and
a shunt trip circuit that is configured to trip the first circuit breaker to disable power to the first receptacle of the power pedestal, responsive to the second circuit breaker associated with the second receptacle of the power pedestal being in an active state.

2. The power pedestal of claim 1, further comprising:
an auxiliary switch associated with the first circuit breaker corresponding to the first receptacle,
wherein the auxiliary switch is configured to receive a status of the second circuit breaker corresponding to the second receptacle.

3. The power pedestal of claim 2, wherein the shunt trip circuit is configured to trip the first circuit breaker to disable power to the first receptacle, responsive to the status of the second circuit breaker indicating that the second circuit breaker is enabled to supply power to the second receptacle.

4. The power pedestal of claim 2,
wherein the auxiliary switch comprises a first auxiliary switch,
wherein the first auxiliary switch comprises an input terminal and first and second output terminals,
wherein the input terminal of the first auxiliary switch is connected to a second auxiliary switch corresponding to the second receptacle to receive the status of the second circuit breaker, and
wherein the first auxiliary switch is configured to cause the shunt trip circuit to place the first circuit breaker in the active state when the input terminal is connected to the first output terminal and is configured to cause the shunt trip circuit to place the first circuit breaker in an inactive state when the input terminal is connected to the second output terminal.

5. The power pedestal of claim 1, wherein the shunt trip circuit is configured to trip the first circuit breaker responsive to a sum of a first power rating of the first receptacle and a second power rating of the second receptacle exceeding a threshold power rating for the power pedestal, when the second receptacle is supplying power to at least one of the external devices.

6. The power pedestal of claim 1,
wherein the second receptacle comprises a plurality of additional receptacles that correspond to a plurality of circuit breakers including the second circuit breaker,
wherein the shunt trip circuit is configured to trip the first circuit breaker to an inactive state responsive to a sum of a first power rating of the first receptacle and a collective power rating of the plurality of additional receptacles exceeding a threshold power rating for the power pedestal, when the additional receptacles are supplying power to at least one of the external devices.

7. The power pedestal of claim 6,
wherein the plurality of additional receptacles are active at a same time, responsive to the collective power rating of the plurality of additional receptacles being below the threshold power rating for the power pedestal.

8. The power pedestal of claim 6,
wherein an overall power rating of the power pedestal is the greater of the first power rating of the first receptacle and the collective power rating of the plurality of additional receptacles.

9. The power pedestal of claim 1, further comprising:
a bus bar configured to supply power to the plurality of receptacles,
wherein the bus bar comprises one or more power lines electrically connected to the first circuit breaker corresponding to the first receptacle and the second circuit breaker corresponding to the second receptacle, and
wherein the bus bar is configured to be coupled to an external power source by one or more wires having respective wire gauges that are insufficient for carrying a load of a sum of power ratings of the plurality of receptacles.

10. A method of operating a power pedestal that comprises plurality of receptacles comprising a first receptacle and a second receptacle that are configured to supply power to external devices, the method comprising:
tripping a first circuit breaker by a shunt trip circuit to disable power to the first receptacle of the power pedestal, responsive to a second circuit breaker associated with the second receptacle of the power pedestal being enabled to supply power to the second receptacle.

11. The method of claim 10, further comprising:
receiving, by an auxiliary switch associated with the shunt trip circuit, a status of the second circuit breaker associated with the second receptacle,
wherein the status indicates when the second circuit breaker is enabled to supply power to the second receptacle.

12. The method of claim 11, wherein the tripping the first circuit breaker by the shunt trip circuit comprises:
tripping the first circuit breaker by the shunt trip circuit to disable power to the first receptacle, responsive to the status of the second circuit breaker indicating that the second circuit breaker is enabled to supply power to the second receptacle.

13. The method of claim 11, wherein the auxiliary switch comprises a first auxiliary switch, wherein the first auxiliary switch comprises an input terminal and first and second output terminals, and wherein the input terminal of the first auxiliary switch is connected to a second auxiliary switch corresponding to the second receptacle to receive the status of the second circuit breaker, further comprising:
switching the first auxiliary switch to the first output terminal or the second output terminal, based on the status of the second circuit breaker received at the input terminal;
placing, by the shunt trip circuit, the first circuit breaker in an active state when the input terminal is connected to the first output terminal; and
placing, by the shunt trip circuit, the first circuit breaker in an inactive state when the input terminal is connected to the second output terminal.

14. The method of claim 10, wherein the tripping the first circuit breaker by the shunt trip circuit comprises:
tripping the first circuit breaker by the shunt trip circuit, responsive to a sum of a first power rating of the first receptacle and a second power rating of the second receptacle exceeding a threshold power rating for the power pedestal, when the second receptacle is supplying power to at least one of the external devices.

15. The method of claim 10, wherein the second receptacle comprises a plurality of additional receptacles that correspond to a plurality of circuit breakers, and wherein the tripping the first circuit breaker by the shunt trip circuit comprises:
tripping the first circuit breaker by the shunt trip circuit to an inactive state responsive to a sum of a first power rating of the first receptacle and a collective power rating of the plurality of additional receptacles exceeding a threshold power rating for the power pedestal, when the additional receptacles are supplying power to at least one of the external devices.

16. The method of claim 15,
wherein the plurality of additional receptacles are active at a same time, responsive to the collective power rating of the plurality of additional receptacles being below the threshold power rating for the power pedestal.

17. The method of claim 15,
wherein an overall power rating of the power pedestal is a greater one of the first power rating of the first receptacle and the collective power rating of the plurality of additional receptacles.

18. The method of claim 10, further comprising:
receiving power at the first receptacle and the second receptacle from a bus bar,
wherein the bus bar comprises one or more power lines electrically connected to the first circuit breaker corresponding to the first receptacle and the second circuit breaker corresponding to the second receptacle, and
wherein the bus bar is configured to be coupled to an external power source by one or more wires having respective wire gauges that are insufficient for carrying a load of a sum of power ratings of the plurality of receptacles.

19. A power pedestal, comprising:
a first receptacle and a second receptacle that are electrically interlocked with one another;
a first auxiliary switch associated with the first receptacle that receives a status from a second auxiliary switch associated with the second receptacle;
a first circuit breaker connected to the first receptacle and a second circuit breaker connected to the second receptacle; and
a first shunt trip circuit that is configured to trip the first circuit breaker to disable power to the first receptacle, responsive to the first auxiliary switch receiving the status from the second auxiliary switch indicating that the second circuit breaker associated with the second receptacle is enabled to supply power to the second receptacle.

20. The power pedestal of claim 19,
wherein the first shunt trip circuit is further configured to enable the first circuit breaker to supply power to the first receptacle, responsive to the first auxiliary switch receiving the status from the second auxiliary switch indicating that the second circuit breaker associated with the second receptacle is disabled from supplying power to the second receptacle.

* * * * *